United States Patent [19]
Yamagishi

[11] Patent Number: 5,614,664
[45] Date of Patent: Mar. 25, 1997

[54] SELF DIAGNOSIS METHOD AND APPARATUS FOR A FUEL TEMPERATURE DETECTION APPARATUS OF AN INTERNAL COMBUSTION ENGINE

[75] Inventor: Yoichiro Yamagishi, Atsugi, Japan

[73] Assignee: Unisia Jecs Corporation, Atsugi, Japan

[21] Appl. No.: 503,494

[22] Filed: Jul. 18, 1995

[30] Foreign Application Priority Data

Jul. 19, 1994 [JP] Japan .................................. 6-167156

[51] Int. Cl.$^6$ .............................. G01K 7/00; G01M 15/00
[52] U.S. Cl. ........................ 73/118.1; 73/117.3; 340/449; 364/431.11; 374/1
[58] Field of Search ........................... 374/1; 364/431.11; 73/116, 117.2, 117.3, 118.1; 340/449

[56] References Cited

U.S. PATENT DOCUMENTS

| | | | |
|---|---|---|---|
| 3,931,619 | 1/1976 | Moore et al. ........................... | 340/449 |
| 4,647,219 | 3/1987 | Figler et al. ............................ | 374/1 |
| 4,901,257 | 2/1990 | Chang et al. ........................... | 374/1 |
| 4,949,078 | 8/1990 | Ito et al. ................................. | 340/449 |
| 5,107,246 | 4/1992 | Mogaki .................................. | 73/118.1 |
| 5,107,247 | 4/1992 | Malaca .................................. | 340/449 |
| 5,319,963 | 6/1994 | Benford ................................. | 73/118.1 |
| 5,388,454 | 2/1995 | Kuroda et al. ......................... | 73/118.1 |

*Primary Examiner*—Richard Chilcot
*Assistant Examiner*—George Dombroske
*Attorney, Agent, or Firm*—Foley & Lardner

[57] ABSTRACT

The invention relates to a method and apparatus for diagnosing an abnormality in an internal combustion engine fuel temperature detection apparatus, by comparing fuel temperature detection values with other detection values for cooling water temperature and intake air temperature. The arrangement is such that when there are large changes in the detection values for the respective temperatures, diagnosis is interrupted, thus enabling the prevention of erroneous diagnosis at the time of hot start and the like when changes in the respective detection values are large.

6 Claims, 4 Drawing Sheets

SELF DIAGNOSIS METHOD AND APPARATUS FOR A FUEL TEMPERATURE DETECTION APPARATUS OF AN INTERNAL COMBUSTION ENGINE

FIELD OF THE INVENTION

The present invention relates to a self diagnosis method and apparatus for a fuel temperature detection apparatus of an internal combustion engine, and in particular to technology for improving self diagnosis accuracy.

DESCRIPTION OF THE RELATED ART

With a conventional internal combustion engine fuel control apparatus, a pressure regulator is provided for adjusting the fuel supply pressure (referred to hereunder as fuel pressure) to the fuel injection valves.

Moreover, there is an arrangement wherein a set pressure for the fuel pressure is adjusted by opening or closing a fuel pressure control valve provided in an intake air introduction passage for introducing negative intake air pressure to a negative pressure chamber of the pressure regulator, based on a detection signal from a fuel temperature sensor provided upstream of the fuel supply port of the fuel injection valve. With this arrangement, if the fuel temperature detected by the fuel temperature sensor drops, the set fuel pressure is reduced by closing the pressure control valve to stop the introduction of negative intake air pressure to the negative pressure chamber. Moreover, if the detection value from the fuel temperature sensor increases, the set fuel pressure is increased by opening the pressure control valve to introduce negative intake air pressure to the negative pressure chamber, thus avoiding the injection of fuel in a vapor condition, and hence preventing deterioration in exhaust emissions.

If the fuel temperature sensor is faulty, however, the abovementioned adjustment of the set fuel pressure will malfunction so that exhaust emissions deteriorate. A fuel temperature sensor self diagnosis apparatus is therefore provided.

This self diagnosis apparatus incorporates a water temperature sensor for detecting the engine cooling water temperature, an intake air temperature sensor for detecting the engine intake air temperature, a fuel temperature sensor provided upstream of the fuel supply port of the fuel injection valve for detecting the fuel temperature, and a self diagnosis device for carrying out a diagnosis of the fuel temperature sensor based on detection values from the respective sensors. It diagnoses that the fuel temperature detection device is faulty when, for example, a detection value of the fuel temperature sensor is high in spite of detection values of the water temperature sensor and the intake air temperature sensor being low.

The abovementioned sensors exhibit output characteristics as shown in FIG. 4. Under operating conditions such as with cold start or hot restart of the engine, for example, there is an abrupt change in the detection values of the sensors as shown in the FIG. 4, so that when a self diagnosis is made, there is the problem that this may be erroneous.

SUMMARY OF THE INVENTION

In view of the above problem, it is an object of the present invention to provide a self diagnosis method and apparatus for a fuel temperature detection apparatus of an internal combustion engine, wherein erroneous diagnosis is avoided and diagnosis accuracy is improved.

Accordingly, a self diagnosis method for a fuel temperature detection apparatus of an internal combustion engine according to the present invention includes;

detecting an engine cooling water temperature by means of a cooling water temperature detection device, detecting an engine intake air temperature by means of an intake air temperature detection device, detecting a fuel temperature by means of a fuel temperature detection device, carrying out diagnosis of the fuel temperature detection device based on detection values from the respective detection devices, and interrupting said diagnosis under predetermined conditions based on change amounts in the respective detection values.

A self diagnosis apparatus for a fuel temperature detection apparatus of an internal combustion engine according to the present invention incorporates;

a cooling water temperature detection device for detecting an engine cooling water temperature, an intake air temperature detection device for detecting an engine intake air temperature, a fuel temperature detection device for detecting a fuel temperature, and a self diagnosis device for carrying out diagnosis of the fuel temperature detection device based on detection values from the respective detection devices, and a diagnosis interrupt device for interrupting diagnosis by the self diagnosis device under predetermined condition based on change amounts in the respective detection values.

With the self diagnosis method and apparatus according to the present invention, under normal conditions, diagnosis of the fuel temperature detection device is carried out based on the respective detection values of the cooling water temperature detection device, the intake air temperature detection device, and the fuel temperature detection device, while under predetermined conditions based on change amounts in the respective detection values, the diagnosis is interrupted.

Accordingly, at the time of hot restart of the engine, for example, when there is an abrupt change in the detection values of the respective detection devices so that the change amounts in the respective detection values are large, then diagnosis by the self diagnosis device is interrupted, thus preventing erroneous diagnosis, while under stable conditions when the change amounts in the respective detection values are small, the self diagnosis is resumed. As a result, diagnosis accuracy can be improved.

For example, if the change amounts in the respective detection values each become equal to or above a predetermined value, then diagnosis by the self diagnosis device is interrupted, while when these drop below the predetermined value, diagnosis resumes.

The diagnosis may include diagnosing that the fuel temperature detection device is abnormal, when the cooling water temperature detected by the cooling water temperature detection device and the intake air temperature detected by the intake air temperature detection device are both low temperature conditions, while the fuel temperature detected by the fuel temperature detection device is a high temperature condition, or when the cooling water temperature and the intake air temperature detected by the respective detection devices are both high temperature conditions, while the fuel temperature detected by the fuel temperature detection device is a low temperature condition.

That is to say, when the plurality of temperature detection values other than the fuel temperature are all at a low temperature condition, while only the fuel temperature detection value is at a high temperature condition, or when the plurality of temperature detection values other than the fuel temperature are all at a high temperature condition, while only the fuel temperature detection value is at a low temperature condition, then since there is a high probability that the detection value for the fuel temperature is abnormal, it is judged that there is an abnormality in the fuel temperature detection device.

Further objects and aspects of the present invention will become apparent from the following description of an embodiment given in conjunction with the appended drawing.

DETAILED DESCRIPTION OF A PREFERRED EMBODIMENT

As follows is a description of an embodiment of the present invention with reference to the figures.

First is a description of a self diagnosis apparatus for a fuel temperature detection apparatus of an internal combustion engine according to the present invention.

Figure 3:
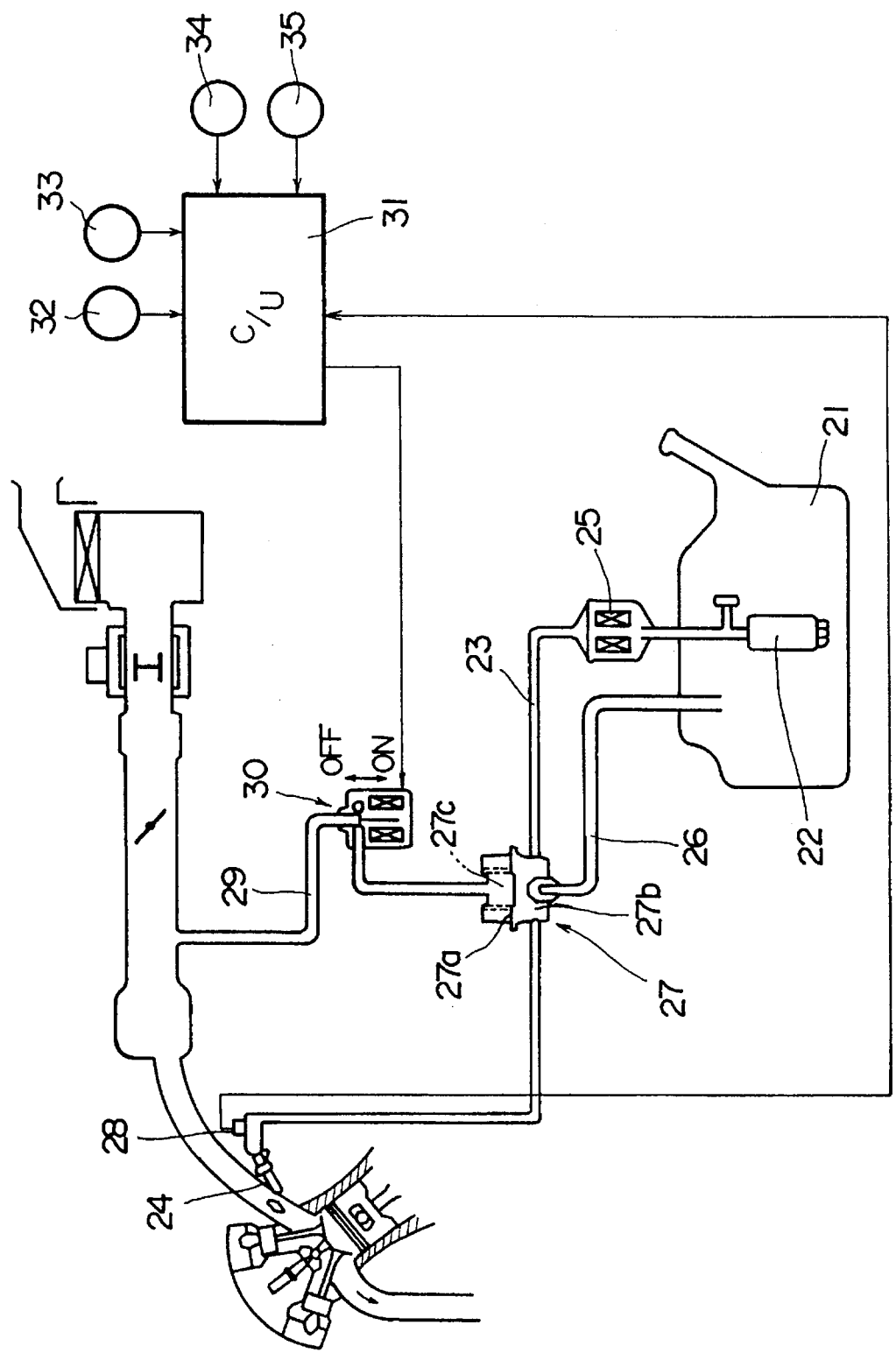
FIG. 3 is a system diagram showing an overall construction of a self diagnosis apparatus for a fuel temperature detection apparatus of an internal combustion engine.
Figure 4:
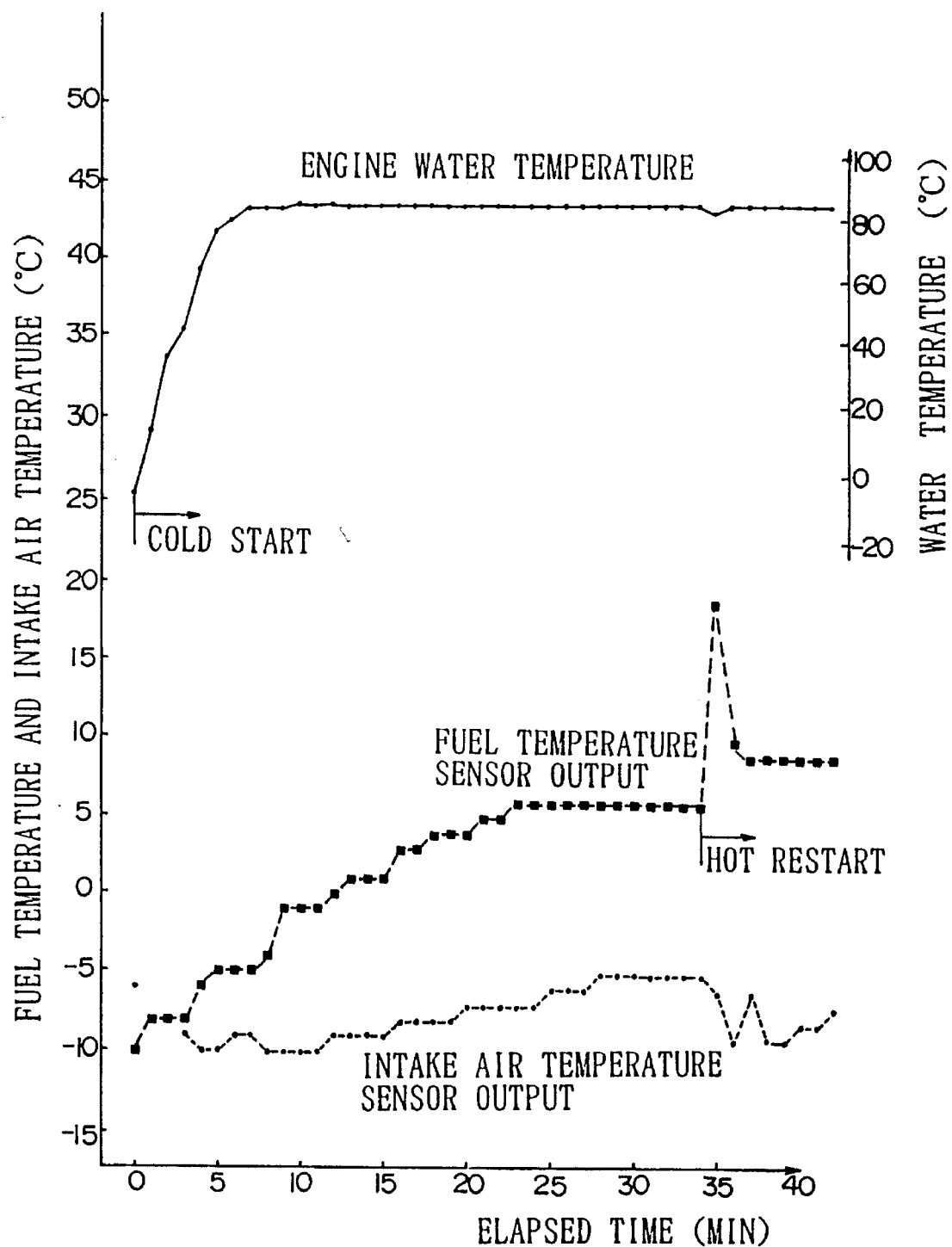
FIG. 4 is a diagram showing an output change of various temperature sensors.

With reference to FIG. 3, fuel inside a fuel tank 21 is drawn up by a fuel pump 22 and discharged therefrom under pressure to respective fuel injection valves 24 (only one shown) through a fuel supply path 23.

The fuel injection valves 24 are solenoid type fuel injection valves which open with power to a solenoid and close with power shut-off. The valve opening is controlled depending on a drive pulse signal of a predetermined pulse width Ti (valve open period) corresponding to a required engine fuel quantity, sent from a control unit 31 (to be described later), so that fuel is injected into an intake air passage downstream of the engine throttle valve.

A fuel filter 25 is disposed within the fuel supply path 23.

The control unit 31 incorporates a microcomputer having a CPU, ROM, RAM, A/D converter, input/output interface and so on. It receives input signals from various sensors to carry out computational processing for the fuel injection quantity based on the input signals, and control drive of the fuel pump 22. It also controls the opening/closing of a fuel pressure control valve 30 disposed in an intake air introduction passage 29 for introducing negative intake air pressure to a negative pressure chamber 27c of a pressure regulator 27, based on a signal from a fuel temperature sensor 28. Moreover, it carries out self diagnosis of the fuel temperature sensor 28 based on signals from a water temperature sensor 32, an intake air temperature sensor 33, and the fuel temperature sensor 28.

For the beforementioned various sensors, there is provided in an intake air duct (not shown), an airflow meter 34 which outputs a signal corresponding to an engine intake air quantity Q.

Also provided is a crank angle sensor 35 which outputs a reference crank angle signal REF for each reference crank angle position (in this embodiment for each TDC), and a unit crank angle signal POS for each 1° or 2° of crank angle. The period of the reference crank angle signal REF (TDC period), or the number of unit crank angle signals POS generated within a predetermined period is measured, to compute an engine rotational speed Ne.

In the control unit 31, a basic fuel injection pulse width Tp (basic valve open time) corresponding to the required engine fuel quantity is computed based on the intake air quantity Q and the engine rotational speed Ne, and various correction coefficients COEF are set from information such as cooling water temperature Tw. The basic fuel injection pulse width Tp is then corrected with the various correction coefficients COEF to thus set the optimum injection pulse width Ti. A drive pulse signal for the optimum injection pulse width Ti is then output at a predetermined timing to the fuel injection valves 24, so that fuel to meet the engine requirements is intermittently injected to the engine by valve open time control of the fuel injection valves 24.

The pressure regulator 27 is provided upstream of the fuel injection valves 24, and operates so that when the fuel pressure is equal to or above a set value, excess fuel is returned to the fuel tank 21 by way of a return path 26.

A self diagnosis routine for the fuel temperature sensor 28 will now be described with reference to the flow chart of FIG. 2.

Figure 1:
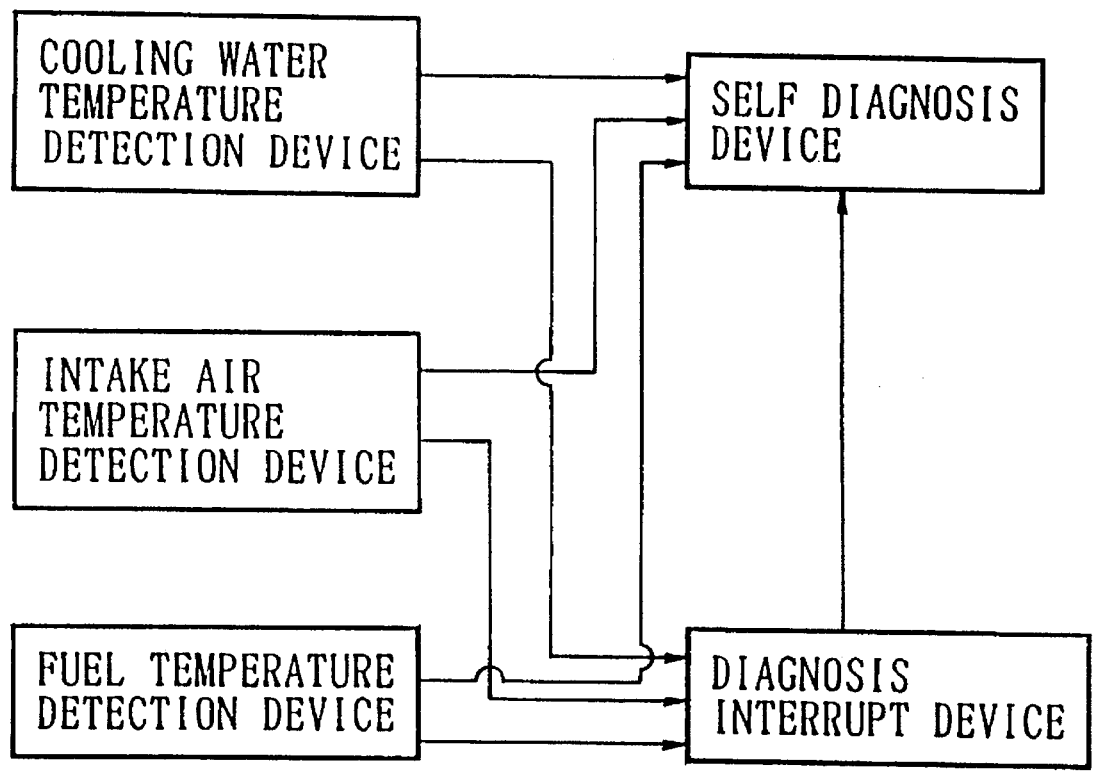
FIG. 1 is a block diagram showing a construction of a self diagnosis apparatus for a fuel temperature detection apparatus of an internal combustion engine according to the present invention.
Figure 2:
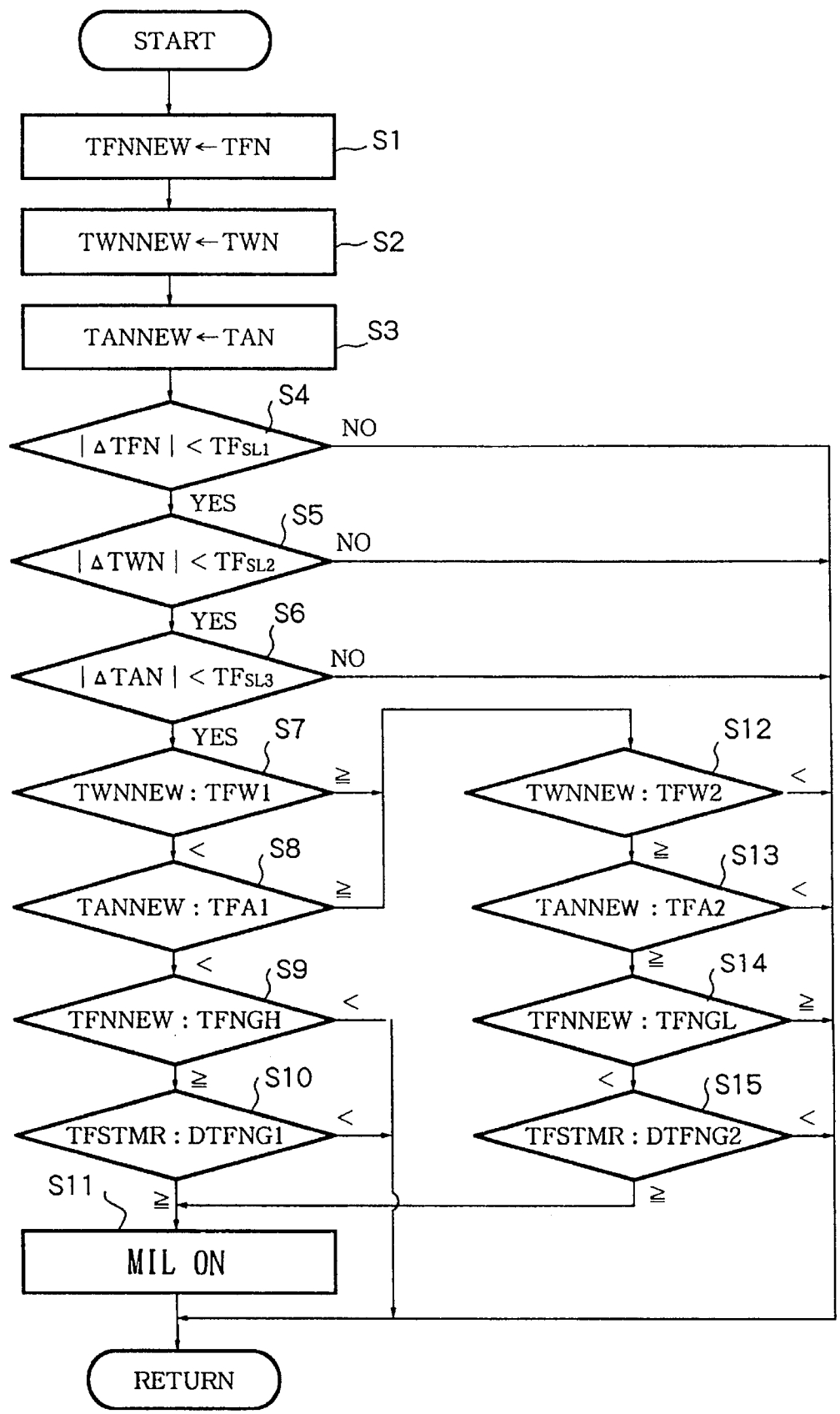
FIG. 2 is a flow chart showing a self diagnosis routine in the fuel temperature detection apparatus.

The functions of a self diagnosis device, and a diagnosis interrupt device are realized by software illustrated by the flow chart of FIG. 2 and stored in the control unit 31.

Initially in step 1 (with "step" denoted by S in the figures and hereunder), a fuel temperature $TFN_{NEW}$ detected by the fuel temperature sensor 28 is input to the control unit 31.

In S2, a cooling water temperature $TWN_{NEW}$ detected by the water temperature sensor 32 is input to the control unit 31.

In S3, an intake air temperature $TAN_{NEW}$ detected by the intake air temperature sensor 33 is input to the control unit 31.

In S4, an absolute value of a difference ΔTFN between the current fuel temperature $TFN_{NEW}$ detected for S1 and a previous fuel temperature $TFN_{OLD}$ is compared with a fuel temperature judgment slice level value $TF_{SL1}$. If less than $TF_{SL1}$, control proceeds to S5, while if equal to or greater than $TF_{SL1}$, the routine is terminated.

In S5, an absolute value of a difference ΔTWN between the current cooling water temperature $TWN_{NEW}$ detected for S2 and a previous cooling water temperature $TWN_{OLD}$ is compared with a cooling water temperature judgment slice level value $TF_{SL2}$. If less than $TF_{SL2}$, control proceeds to S6, while if equal to or greater than $TF_{SL2}$, the routine is terminated.

In S6, an absolute value of a difference ΔTAN between the current intake air temperature $TAN_{NEW}$ detected for S3 and a previous intake air temperature $TAN_{OLD}$ is compared with an intake air temperature judgment slice level value $TF_{SL3}$. If less than $TF_{SL3}$, control proceeds to S7, while if equal to or greater than $TF_{SL3}$, the routine is terminated.

In S7, the current cooling water temperature $TWN_{NEW}$ is compared with a diagnosis conditions low water temperature upper limit TFW1. If the current cooling water temperature $TWN_{NEW}$ is lower than the diagnosis conditions low water temperature upper limit TFW1, control proceeds to S8 where judgment of the intake air temperature TAN is made, while if the cooling water temperature $TWN_{NEW}$ is equal to or higher than the diagnosis conditions low water temperature upper limit TFW1, control proceeds to S12 where the cooling water temperature $TWN_{NEW}$ is compared with a diagnosis conditions high water temperature lower limit TFW2.

In S8, the intake air temperature $TAN_{NEW}$ is compared with a diagnosis conditions low intake air temperature upper limit TFA1. If the intake air temperature $TAN_{NEW}$ is lower than the diagnosis conditions low intake air temperature upper limit TFA1, control proceeds to S9 where judgment of the fuel temperature TFN is made, while if the intake air temperature $TAN_{NEW}$ is equal to or higher than diagnosis conditions low intake air temperature upper limit TFA1, control proceeds to S12 where the cooling water temperature $TWN_{NEW}$ is compared with the diagnosis conditions high water temperature lower limit TFW2.

In S9, the fuel temperature $TFN_{NEW}$ is compared with a NG judgement low fuel temperature upper limit $TF_{NGH}$. If the fuel temperature $TFN_{NEW}$ is equal to or higher than the NG judgement low fuel temperature upper limit $TF_{NGH}$, control proceeds to S10 where judgment of a NG condition hold time $TFS_{TMR}$ is made, while if the fuel temperature $TFN_{NEW}$ is lower than the NG judgement low fuel temperature upper limit $TF_{NGH}$, a fault is not judged and the routine is therefore terminated.

In S10, the NG condition hold time $TFS_{TMR}$ is compared with a judgment delay $DTF_{NG1}$. If the NG condition hold time $TFS_{TMR}$ is equal to or longer than the judgment delay $DTF_{NG1}$, this is judged as a fault and control therefore proceeds to S11 where MIL comes on, while if the NG condition hold time $TFS_{TMR}$ does not exceed the judgment delay $DTF_{NG1}$, the routine is terminated.

In S12, as mentioned before, the cooling water temperature $TWN_{NEW}$ is compared with the diagnosis conditions high water temperature lower limit TFW2, and if $TWN_{NEW}>TFW2$, control proceeds to S13, while if $TWN_{NEW}<TFW2$, the routine is terminated.

In S13, the intake air temperature $TAN_{NEW}$ is compared with a diagnosis conditions high intake air temperature lower limit TFA2, and if $TAN_{NEW}>TFA2$, control proceeds to S14, while if $TAN_{NEW}<TFA2$, the routine is terminated.

In S14, the fuel temperature $TFN_{NEW}$ is compared with a NG judgement high fuel temperature lower limit $TF_{NGL}$, and if $TFN_{NEW}<TF_{NGL}$, control proceeds to S15, while if $TF_{NEW}\geq TF_{NGL}$, the routine is terminated.

In S15, the NG condition hold time $TFS_{TMR}$ is compared with the judgment delay $DTF_{NG2}$, and if $TFS_{TMR}\geq DTF_{NG2}$, this is diagnosed as a fault and control therefore proceeds to S11 where MIL comes on, while if the NG condition hold time $TFS_{TMR}$ does not exceed the judgment delay $DTF_{NG2}$, a fault is not judged, and the routine is therefore terminated.

More specifically, in the case wherein a fuel temperature high condition continues for a predetermined time $DTF_{NG1}$, in spite of both the engine temperature and intake air temperature being low, or in the case wherein a fuel temperature low condition continues for a predetermined time $DTF_{NG2}$, in spite of both the engine temperature and intake air temperature being high, the fuel temperature sensor 28 is judged to be faulty, and MIL comes on.

Here S4 through S6 correspond to the diagnosis interrupt device while S7 through S15 correspond to the self diagnosis device.

With the above arrangement, at the time of hot restart of the engine for example, when there is an abrupt change in the detection values of the respective sensors so that the change amounts in the respective detection values are large, then diagnosis by the self diagnosis device is interrupted, thus preventing erroneous diagnosis, while under stable conditions when the change amounts in the respective detection values are small, the self diagnosis is resumed. As a result, diagnosis accuracy can be improved.

With the present invention as described above, since a diagnosis interrupt device is provided which interrupts diagnosis by the self diagnosis device, based on change amounts in the respective detection values of the cooling water temperature detection device, the intake air temperature detection device, and the fuel temperature detection device, then erroneous diagnosis is prevented at the time of hot restart of the engine, for example, when there is an abrupt change in the detection values of the respective detection devices.

Moreover, in the case wherein a diagnosis interrupt device is provided which interrupts diagnosis by the self diagnosis device if the change amounts in the respective detection values each become equal to or above a predetermined value, and allows resumption of the diagnosis when the change amounts drop below the predetermined value, then self diagnosis can be resumed under stable conditions when the change amounts in the respective detection values are small, so that self diagnosis accuracy can be improved.

I claim:

1. A self diagnosis method for a fuel temperature detection apparatus of an internal combustion engine, comprising the steps of:

detecting an engine cooling water temperature by means of a cooling water temperature detection means, detecting an engine intake air temperature by means of an intake air temperature detection means, detecting a fuel temperature by means of a fuel temperature detection means, carrying out diagnosis of said fuel temperature detection means based on respective detection values from said cooling water temperature detection means, said engine intake air temperature detection means, and said fuel temperature detection means, and interrupting said diagnosis under predetermined conditions based on changes in said respective detection values from said cooling water temperature detection means, said engine intake air temperature detection means, and said fuel temperature detection means.

2. A self diagnosis method for a fuel temperature detection apparatus of an internal combustion engine according to claim 1, wherein said diagnosis interruption includes interrupting diagnosis when said changes in said respective detection values from said cooling water temperature detection means, said engine intake air temperature detection means, and said fuel temperature detection means each become equal to or above a predetermined value, and allowing resumption of diagnosis when the changes drop below the predetermined value.

3. A self diagnosis method for a fuel temperature detection apparatus of an internal combustion engine according to claim 1, wherein said self diagnosis includes diagnosing that the fuel temperature detection means is abnormal when said cooling water temperature and intake air temperature are both low temperature conditions, while the fuel temperature is a high temperature condition, or when said cooling water temperature and intake air temperature are both high temperature conditions, while the fuel temperature is a low temperature condition.

4. A self diagnosis apparatus for a fuel temperature detection apparatus of an internal combustion engine, comprising:

cooling water temperature detection means for detecting an engine cooling water temperature, intake air temperature detection means for detecting an engine intake air temperature, fuel temperature detection means for detecting a fuel temperature, self diagnosis means for carrying out diagnosis of said fuel temperature detection means based on respective detection values from said cooling water temperature detection means, said intake air temperature detection means, and said fuel temperature detection means, and diagnosis interrupt means for interrupting diagnosis by said self diagnosis means under predetermined conditions based on changes in said respective detection values from said intake air temperature detection means, and said fuel temperature detection means.

5. A self diagnosis apparatus for a fuel temperature detection apparatus of an internal combustion engine according to claim 4, wherein said diagnosis interrupt means interrupts diagnosis by said self diagnosis means if said changes in said respective detection values from said intake air temperature detection means, and said fuel temperature detection means each become equal to or above a predetermined value, and allows resumption of diagnosis when the changes drop below the predetermined value.

6. A self diagnosis apparatus for a fuel temperature detection apparatus of an internal combustion engine according to claim 4, wherein said self diagnosis means diagnoses that said fuel temperature detection means is abnormal, when the cooling water temperature detected by said cooling water temperature detection means and the intake air temperature detected by said intake air temperature detection means are both low temperature conditions, while the fuel temperature detected by said fuel temperature detection means is a high temperature condition, or when the cooling water temperature and the intake air temperature detected by said respective detection means are both high temperature conditions, while the fuel temperature detected by said fuel temperature detection means is a low temperature condition.

* * * * *